(12) United States Patent
Zhou et al.

(10) Patent No.: US 11,860,380 B1
(45) Date of Patent: Jan. 2, 2024

(54) LENS ASSEMBLY ALIGNMENT TOOL (71) Applicant: MLOptic Corp, Redmond, WA (US)

(72) Inventors: Wei Zhou, Sammamish, WA (US);
Yubo Guan, Redmond, WA (US);
Jiang He, Redmond, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/234,133

(22) Filed: Aug. 15, 2023

(51) Int. Cl.
*G02B 27/62* (2006.01)
*G02B 7/00* (2021.01)

(52) U.S. Cl.
CPC ............. *G02B 27/62* (2013.01); *G02B 7/003* (2013.01)

(58) Field of Classification Search
CPC ..... G01N 27/3272; G02B 27/62; G02B 7/003
See application file for complete search history.

(56) References Cited

U.S. PATENT DOCUMENTS

| | | | |
|---|---|---|---|
| 8,760,666 B2 * | 6/2014 | Heinisch | G01M 11/0221 356/505 |
| 9,766,155 B2 | 9/2017 | Oya et al. | |
| 2021/0356758 A1 * | 11/2021 | Au | G02B 7/025 |

\* cited by examiner

*Primary Examiner* — Joseph P Martinez
*Assistant Examiner* — Vipin Patel
(74) *Attorney, Agent, or Firm* — Jong Patent Firm; Cheng Ning Jong; Tracy P. Jong (57) ABSTRACT

An alignment tool including a first and a second positioning system configured for positioning and orientating a first lens and a second lens respectively, wherein a light beam is configured to be disposed through the first lens and the second lens to cast a light spot on the image plane, if the light spot does not stay stationary on the image plane when at least one of the first lens and the second lens is rotated about the central axis of the light beam, at least one of the first positioning system and the second positioning system is actuated to alter at least one of the position and orientation of at least one of the first lens and the second lens until the light spot becomes stationary on the image plane, indicating the first lens is coaxially disposed with the second lens.

9 Claims, 7 Drawing Sheets

LENS ASSEMBLY ALIGNMENT TOOL

BACKGROUND

1. The Field of the Invention

The present invention relates to a system and method for aligning and attaching multiple lenses. More specifically, the present invention is directed to a system and method for aligning and combining multiple lenses where at least one of the lenses is not symmetrical about its optical axis or is an irregularly shaped lens that may also be aspheric.

2. Background Art

In the manufacture or assembly of high-quality multi-lens optical systems, the lenses must be aligned relative to one another with high accuracy. U.S. Pat. No. 9,766,155 to Oya et al. (hereinafter Oya) discloses a method for measuring the positions of centers of curvature of optical surfaces of a single or multi-lens optical system, an imaging lens system simultaneously images an object plane into a first and a second image plane. The optical system is arranged so that a supposed position of a first center of curvature is situated in the first image plane of the imaging lens system and a supposed position of a second center of curvature is situated in the second image plane of the imaging lens system. An object arranged in the object plane is then imaged simultaneously or sequentially at the first and the second image plane by means of measuring light.

Reflections of the measuring light at optical surfaces of the optical system are detected by means of a spatially resolving light sensor. The actual positions of the first and the second center of curvature are calculated from the detected reflexes. Oya's device and method are suitable for measuring the positions of centers of curvature of optical surfaces of a single or multi-lens optical system where one or more lenses of the optical system are symmetrical about their respective optical axes. However, in an optical system involving at least one lens that is asymmetrical about its optical axis, Oya's device and method would not work. Further, in Oya, upon determining the optical centers of the lenses of an optical system by calculation, this information is memorized and used for subsequent alignment of lenses by aligning the lenses by their optical axes without the benefit of real time alignment under real time conditions. Therefore, Oya's device and method rely on previously determined piece-wise optical data for alignment without the benefit of verifying the alignment of multiple lenses as a combined optical system before the lenses are permanently fixed together.

There exists a need for a system and method for aligning an optical system having at least one lens that is asymmetrical about its optical axis or is an irregularly-shaped lens that may also be aspheric. There also exists a need for a system and method for aligning optical components of an optical system where the alignment of lenses can be optically and visually confirmed to ensure that a quality-targeted alignment has indeed been achieved.

SUMMARY OF THE INVENTION

In accordance with the present invention, there is provided an alignment tool including:
 (a) a first positioning system including an at least 5-axis positioning system, the first positioning system configured for positioning and orientating a first lens having an optical axis; and
 (b) a second positioning system including an at least 5-axis positioning system, the second positioning system configured for positioning and orientating a second lens having an optical axis,
wherein a light beam is configured to be disposed through the first lens and the second lens to cast an image onto an image plane, the image including a light spot on the image plane, if the light spot does not stay stationary on the image plane when at least one of the first lens and the second lens is rotated about the central axis of the light beam, at least one of the first positioning system and the second positioning system is actuated to alter at least one of the position and orientation of at least one of the first lens and the second lens until the light spot becomes stationary on the image plane, indicating the first lens is coaxially disposed with the second lens.

In one embodiment, the light beam is a laser beam. In one embodiment, the alignment tool further includes a telecentric lens disposed downstream from the second lens to remove an angular shift of the image, wherein the second lens is disposed at a location that is optically downstream from the first lens. In one embodiment, the at least one of the first positioning system and the second positioning system is a 6-axis positioning system. In one embodiment, the at least one of the first lens and the second lens is an irregularly-shaped lens. In one embodiment, the alignment tool further includes a fixing tool configured for permanently fixing the first lens to the second lens.

In accordance with the present invention, there is further provided a method for optically aligning two lenses each having an optical axis, the method including projecting a light beam through the two lenses to cast an image on an image plane, wherein the image includes a light spot on the image plane, if the light spot does not stay stationary on the image plane when at least one of the two lenses is rotated about the central axis of the light beam, at least one of the relative position and relative orientation of the two lenses is altered until the light spot becomes stationary on the image plane, indicating the optical axes of the two lenses are coaxially disposed.

In one embodiment, the light beam is a laser beam. In one embodiment, the method further includes disposing a telecentric lens downstream from the optically downstream lens of the two lenses to remove an angular shift of the image. In one embodiment, the light beam is a laser beam. In one embodiment, the at least one of the relative position and relative orientation of the two lenses is altered using an at least 5-axis positioning system. In one embodiment, the at least one of the two lenses is an irregularly-shaped lens.

An object of the present invention is to provide a system and method for aligning and attaching multiple lenses where at least one of the lenses is not symmetrical about its optical axis or at least one of the lenses is irregularly shaped.

An object of the present invention is to provide a system and method for aligning and attaching multiple lenses where at least one of the lenses is aspheric.

Another object of the present invention is to provide a system and method for aligning lenses of an optical system where the alignment of lenses can be optically and visually confirmed to ensure that a quality-targeted alignment has indeed been achieved.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—alignment tool
4—positioning system, e.g., 6-axis positioning system
6—positioning system, e.g., 6-axis positioning system
8—lens
10—lens
12—light source
14—side
16—optical axis of lens
18—optical axis of lens
20—beam splitter
22—light beam downstream from lenses to be aligned
24—lens, e.g., telecentric lens
26—image plane, e.g., camera
28—spot
30—peripherally-disposed marker, e.g., cross
32—light panel
34—camera
36—illuminator
38—camera
40—light beam
42—adhesive
44—UV light source
46—rotation of first lens about z-axis
48—center-disposed marker, e.g., cross
50—field of view of camera
52—adhesive dispenser
54—rotation of second lens about z-axis
56—rotation of combined first and second lenses about z-axis Particular Advantages of the Invention The present alignment tool functions based on the concept of aligning lenses by their optical axes, the alignment of which is indicated by the stationary condition of a light spot cast at an angular magnifier using a light beam when at least one of the lenses is rotated about the central axis of the light beam. As such, the alignment process of the present alignment tool can be completed in real time, removing the need for the tool to "memorize" the predetermined optical axes of respective lenses to be combined. Instead, any required adjustments in the position and orientation of each of the lenses can be made while the confirmation of alignment can be obtained in real time visually.

The present alignment tool is useful for aligning one or more irregularly-shaped lenses or one or more irregularly-shaped lenses that may also be aspheric. In the case of an aspherical lens, the present alignment tool requires no distinction between spherical and aspherical portions of aspherical optical surfaces, removing the need for involving any complexities associated with alignment methods involving such concerns.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
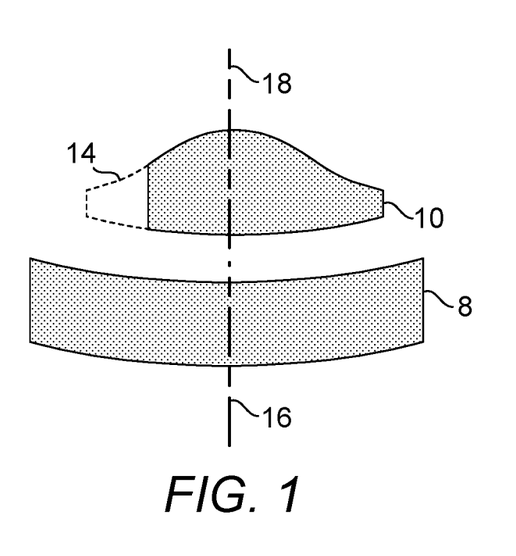
FIG. 1 is a diagram depicting a cross-sectional view of a second lens that is required to be aligned with a first lens before the second lens can be fixed to the first lens.
Figure 2:
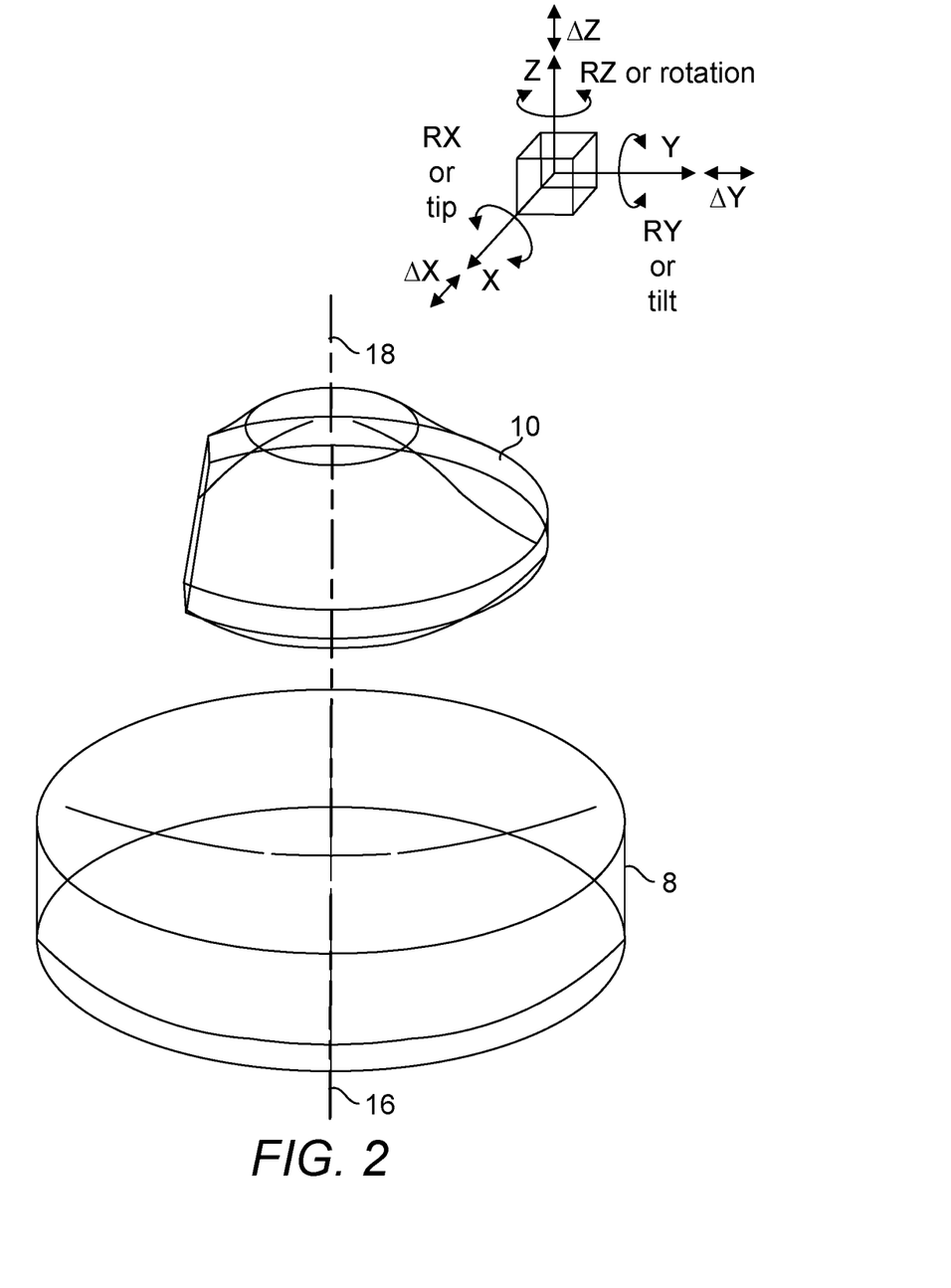
FIG. 2 is a diagram depicting a top perspective view of a second lens that is required to be aligned with a first lens before the second lens can be fixed to the first lens.

FIG. 1 is a diagram depicting a cross-sectional view of a second lens 10 that is required to be aligned with a first lens before the second lens can be fixed to the first lens 8. FIG. 2 is a diagram depicting a top perspective view of a second lens 10 that is required to be aligned with a first lens before the second lens can be fixed to the first lens 8. Examples of such lenses include, but not limited to those lenses used in augmented reality (AR) and virtual reality (VR) applications. Although a present alignment tool is useful for aligning both lenses that are symmetrical and asymmetrical about their respective optical axes, it shall be noted that the present alignment tool is especially useful for aligning a lens that is asymmetrical about its optical axis and or irregular shape such as the second lens 10 that is to be aligned with the first lens 8. It shall be noted that, in this example, the irregularly shaped lens, i.e., the second lens 10 is an irregularly-shaped lens which has one of its sides, i.e., side 14 severed and removed. As such, an alignment technique of Oya is not applicable for aligning such a lens. It shall be noted that the second lens is also aspheric. An alignment of the first lens 8 and second lens 10 is said to have been achieved when the first lens 8 is optically coaxially disposed with the second lens 10, i.e., the optical axis 16 of the first lens 8 is coaxially disposed with the optical axis 18 of the second lens 10. In order for the second lens 10 to be optically coaxially aligned with the first lens 8, a translation of the second lens 10 in the X and Y-direction and a rotation about the X, Y and Z-axis may be required. Therefore, in aligning the second lens 10 with respect to the first lens 8, a motion stage of at least five degrees of freedom or at least a 5-axis motion stage may be required. Although the example disclosed herein involves a lens-to-lens fixing or bonding process, the present alignment tool can also be used to align a lens to a display, e.g., a microLED (mLED) panel, a micro OLED panel or a liquid crystal on silicon (LCOS) panel.

Figure 3:
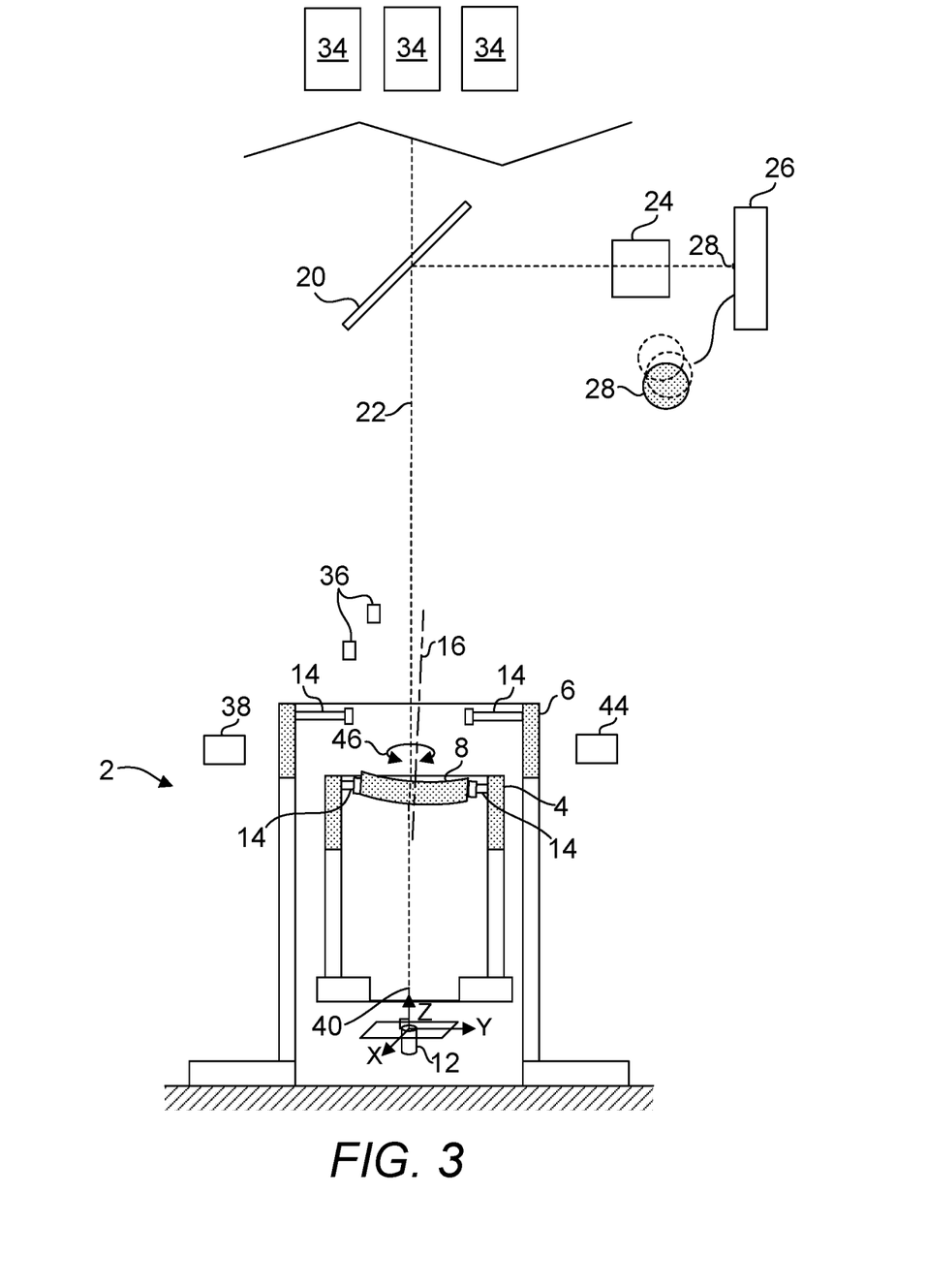
FIG. 3 is a diagram depicting one embodiment of a present alignment tool configured for optically aligning a plurality of lenses where a first lens is aligned before a second lens is received by the tool to be aligned with the first lens.

FIG. 3 is a diagram depicting one embodiment of a present alignment tool configured for optically aligning a plurality of lenses where a first lens 8 is aligned before a second lens 10 is received by the tool to be aligned with the first lens 8. The alignment tool 2 includes a first positioning system 4 and a second positioning system 6 to allocate the optical axes of the first lens 8 and the second lens 10. The first positioning system 4 includes an at least 5-axis positioning system and is configured for positioning and orientating a first lens 8. The second positioning system 6 includes an at least 5-axis positioning system and is configured for positioning and orientating a second lens. In this example, the first lens 8 is aligned first with a light beam of light source 12 without a second lens having been positioned in place by the second positioning system 6. The first lens 8 is shown supported on supports 14 functionally connected to actuators of the first positioning system 4. In aligning the first lens 8, a light beam 40, e.g., a laser beam of the light source 12, is disposed through the first lens 8 only as a second lens is not mounted on the second positioning system 6 for alignment, to cast an image onto an image plane 26 of an angular magnifier via a beam splitter 20. If the first lens 8 is disposed in a position and orientation out of alignment with the light beam 40, the spot 28 cast on the image plane 26 will shift when at least one of the lenses 8, 10 is rotated about the central axis of the light beam. The central axis of the light beam is essentially disposed centrally with respect to a cross-section of the light beam that is perpendicular to the light beam. It shall be noted that the light beam 22 downstream from lenses 8, 10 has been modified due to the position and orientation of the first lens 8 not having been aligned with the light beam 40. In order to align the optical axis of the first lens 8 with the light beam, the position and/or orientation of the first lens 8 are altered such that the spot 28 shown on the image plane 26 ceases to shift when at least one of the lenses 8, 10 is rotated about the central axis of the light beam. In one embodiment, the image plane 26 is a panel for receiving the cast image clearly such that the spot cast can be seen clearly. In another embodiment, the image plane is a camera configured for receiving such image such that it can be visually conveyed remotely for a remote operator to either perform the alignment process manually or such image can be used in an automatic alignment process where the control process in aligning the lenses to make the spot stationary on the image plane is performed automatically. A multi-axis positioning system is capable of causing positioning changes in three mutually exclusive directions, e.g., X, Y and Z axes and three mutually exclusive rotations, e.g., tip about the X-axis, tilt about the Y-axis and rotation about the Z-axis. In using a multi-axis positioning system to automatically establish an alignment of the first lens 8 with respect to the light beam 40, the first lens 8 is first controlled to move or rotate in a direction using an actuator useful for controlling motion in that direction or axis. If the shift is determined to be increasing, the first lens 8 is then driven in the opposite direction in progressive positional increments. The shift should decrease until it increases again. When the shift is determined to have increased, the first lens 8 is again controlled to move in the opposite direction to a prior position, again in progressive positional increments, before the shift started to increase. If the shift is still discernible, this process of controlling the first lens 8 is then repeated along one or more axes until the shift ceases. When the shift ceases, the first lens 8 is said to have been aligned with the light beam 40. In the embodiment shown, the alignment tool 2 further includes a telecentric lens 24 disposed downstream from a first lens 8 or a second lens to be aligned to remove an angular shift of the image cast on the image plane 26, making the spot 28 more precise in order to increase the precision of the alignment of a first lens with respect to the light beam 40 or the alignment of a second lens with respect to an aligned first lens. In one embodiment, each of the first 4 and second 6 positioning system is a 6-axis positioning system as these devices are more readily available even though a translation in the Z-axis (in the up and down direction) is not required in the alignment of the two lenses 8, 10.

Figure 4:
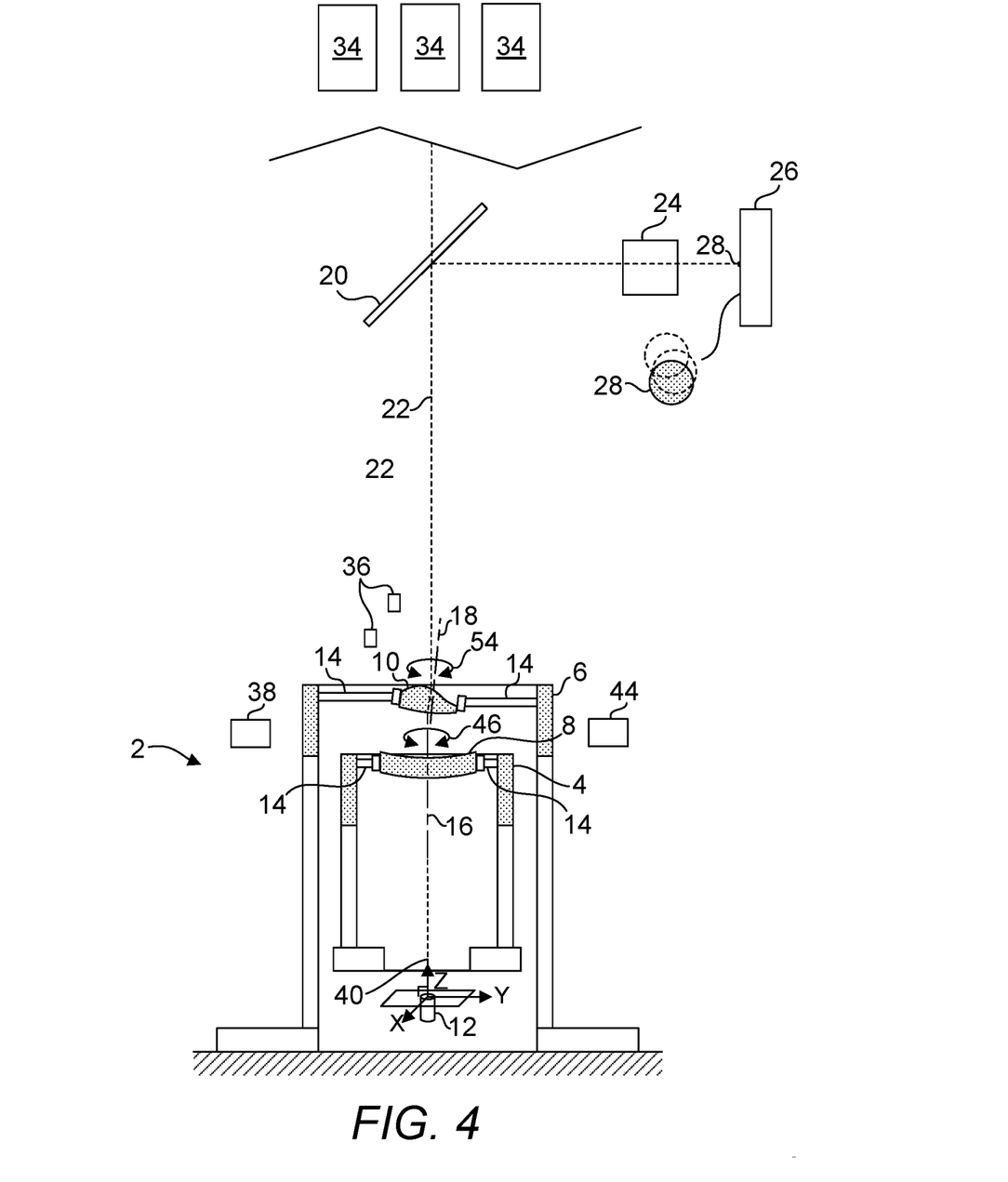
FIG. 4 is a diagram depicting one embodiment of a present alignment tool configured for optically aligning a plurality of lenses where a second lens is shown disposed in a position to be aligned with an aligned first lens.

FIG. 4 is a diagram depicting one embodiment of a present alignment tool configured for optically aligning a plurality of lenses where a second lens 10 is shown disposed in a position to be aligned with an aligned first lens 8. As the first lens has been aligned with the light beam 40, the second lens can now be received at the second positioning system 6 to be aligned with respect to the first lens 8. The second lens 10 is shown supported on supports 14 functionally connected to actuators of the second positioning system 6. In aligning the second lens 10 with respect to the first lens 8, the light beam 40, e.g., a laser beam of the light source 12, is disposed through the first lens 8 and the second lens 10 to cast an image onto the image plane 26 of the angular magnifier via the beam splitter 20. If the second lens 10 is disposed in a position and orientation out of alignment with the light beam 40 and the first lens 8, again, a shift of the spot is again observed. In order to align the optical axis of the second lens 10 with the first lens 8, the position and/or orientation of the second lens 10 are altered such that the shift ceases. The alignment process disclosed elsewhere herein for the first lens 8 can now be applied to the alignment of the second lens 10.

Figure 5:
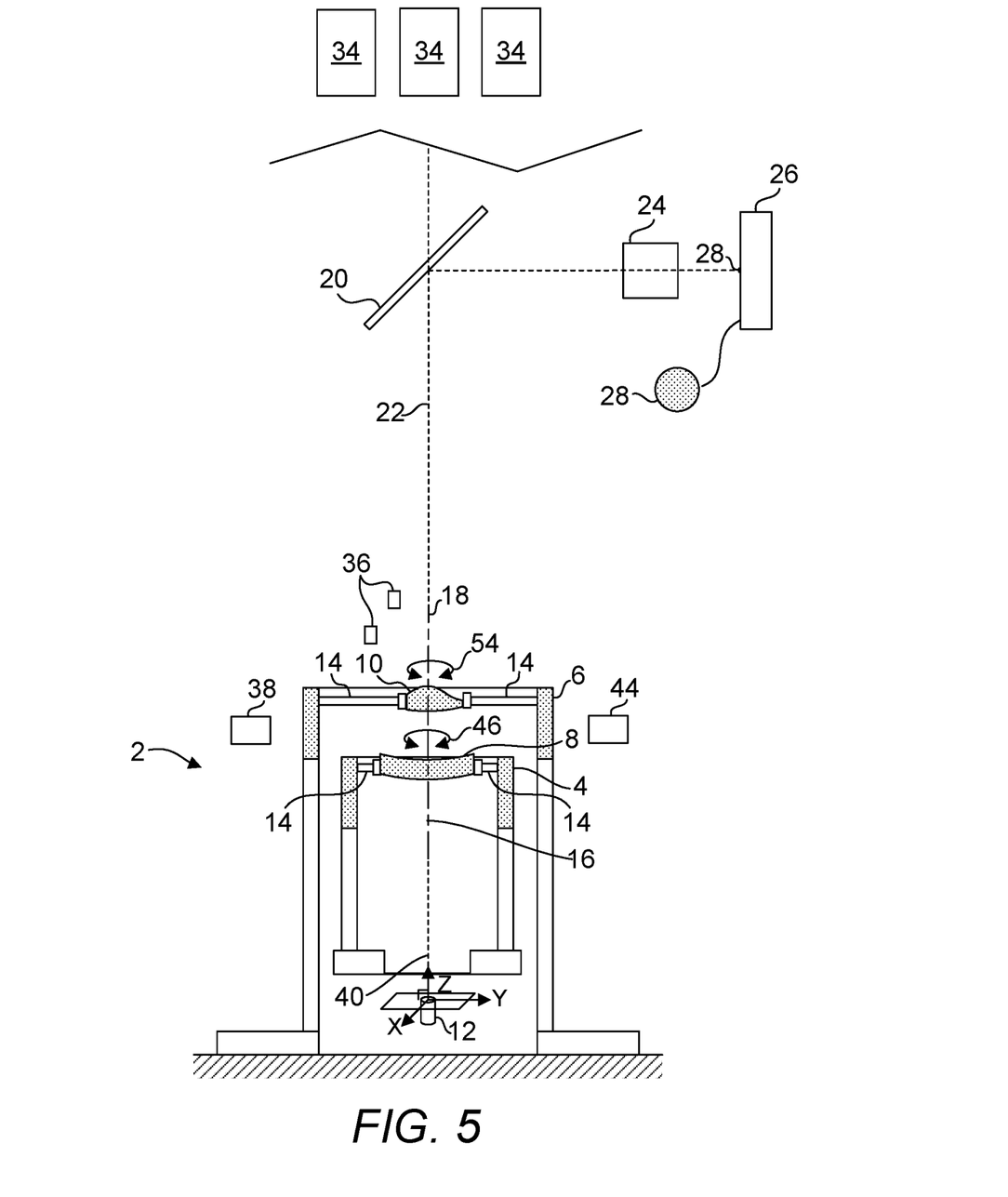
FIG. 5 is a diagram depicting one embodiment of a present alignment tool configured for optically aligning a plurality of lenses where a second lens is shown to have been aligned with an aligned first lens.
Figure 6:
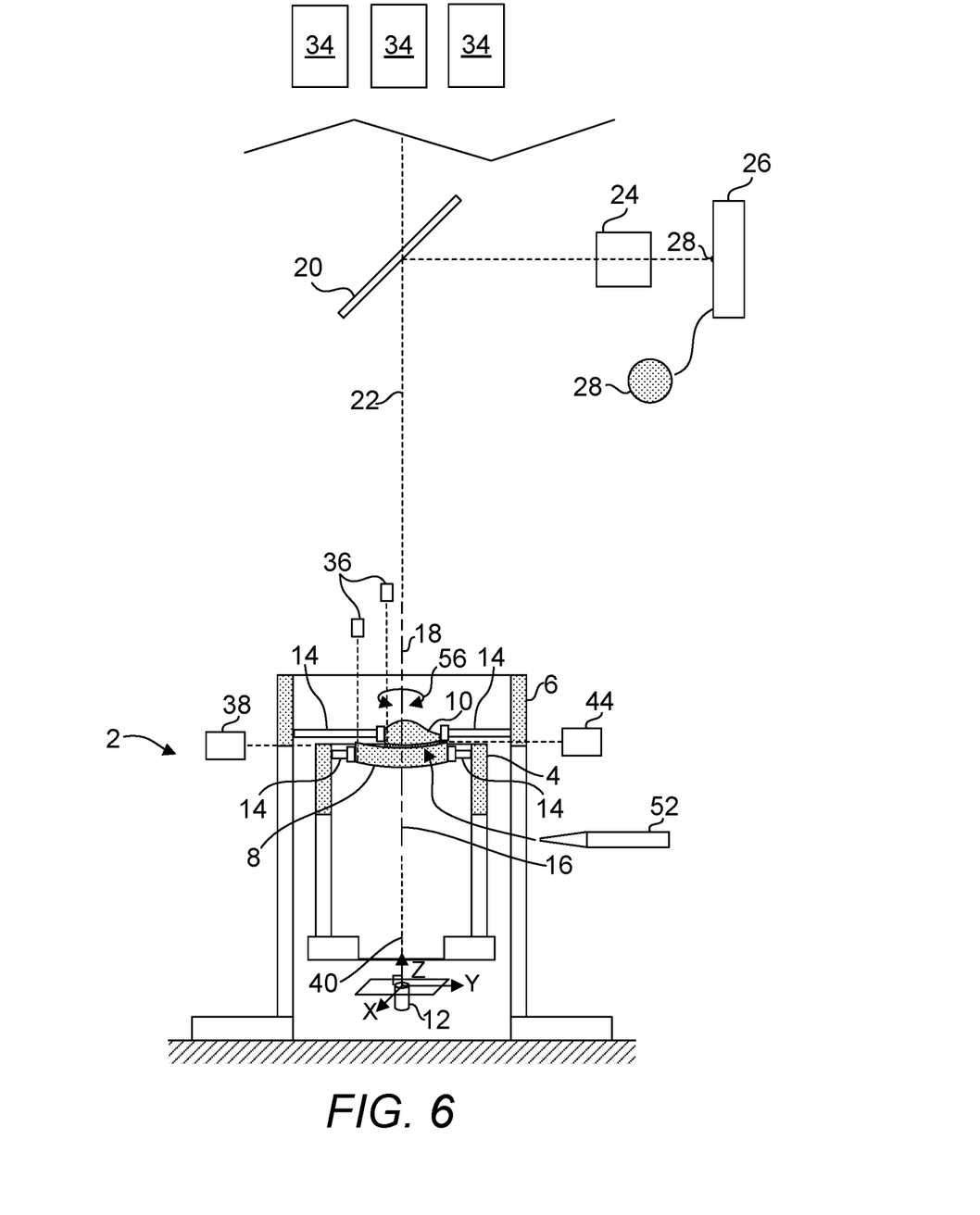
FIG. 6 is a diagram depicting one embodiment of a present alignment tool configured for optically aligning a plurality of lenses where an aligned second lens is shown attached to an aligned first lens.

FIG. 5 is a diagram depicting one embodiment of a present alignment tool configured for optically aligning a plurality of lenses where a second lens 10 is shown to have been aligned with an aligned first lens 8 as evidenced by the stationary spot 28 when the either one or both of the first lens and second lens have been rotated in rotation 46, 54, 56 about the central axis of the light beam. Care must be taken to ensure that for a lens to be aligned with another, it must be placed at a location well clear of the other lens that it is aligned against. Upon alignment of the two lenses, e.g., those constructed from glass or plastic, they can then be permanently combined to produce a unified or combined lens. FIG. 6 is a diagram depicting one embodiment of a present alignment tool configured for optically aligning a plurality of lenses 8, 10 where an aligned second lens 10 is shown attached or fixed to an aligned first lens 8. Shown herein is a fixing tool which facilitates the permanent attachment of the lenses 8, 10. The fixing tool may include a mechanism for ascertaining a desired gap between the lenses 8, 10 has been achieve, e.g., a camera and a dispenser 52 for dispensing an adhesive used to hold the lenses 8, 10 together. In fixing the second lens 10 to the first lens 8, a camera 38 can be used to observe the gap between the two aligned lenses 8, 10 and the two lenses 8, 10 can be unified at a precise gap after an adhesive 42 has been applied to a location upon which the second lens 10 is to be fixed to the first lens 8. The lenses 8, 10 are brought closer together by either adjusting one or both of the lenses 8, 10 in the Z-direction. One or more illuminators 36 are used to illuminate the edges of the lenses 8, 10 to provide a visual aid for facilitating the identification of the edges of the lenses for vertical positioning of lenses 8, 10. As the distance between the lenses can be controlled using the thickness of the adhesive bonding the lenses together, the amount of adhesive desired can be calculated and applied to achieve this distance when the applied adhesive 42 sets. An ultraviolet (UV) light source 44 is provided to hasten the curing of the adhesive 42. The use of a 6-axis positioning system provides the added ability to move a lens in the Z-direction, allowing the control of the distance between the lenses using the positioning system itself without the need for an external means for raising or lowering the lens. Although not shown, it shall be understood that the process of allocating the optical axes for additional lenses can be achieved using a process similar to the one disclosed elsewhere herein. Without adding additional one or more positioning systems, the first positioning system continues to hold the unified lens while the second positioning system is used to hold a new lens to be added to the unified lens. In one embodiment not shown, the two lenses shown in FIGS. 1-6 may be aligned without first aligning the first lens 8 with the light beam 40 first but rather the two lens 8, 10 are aligned at the same time. While it is possible to align two lenses without first align one of them with a light beam, the process may take longer than the combined effort of first aligning the first lens with a light beam and then aligning the two lenses as there could be more than two spots appearing at the image plane used for guiding the position and/or orientation adjustments of the lenses.

Figure 7:
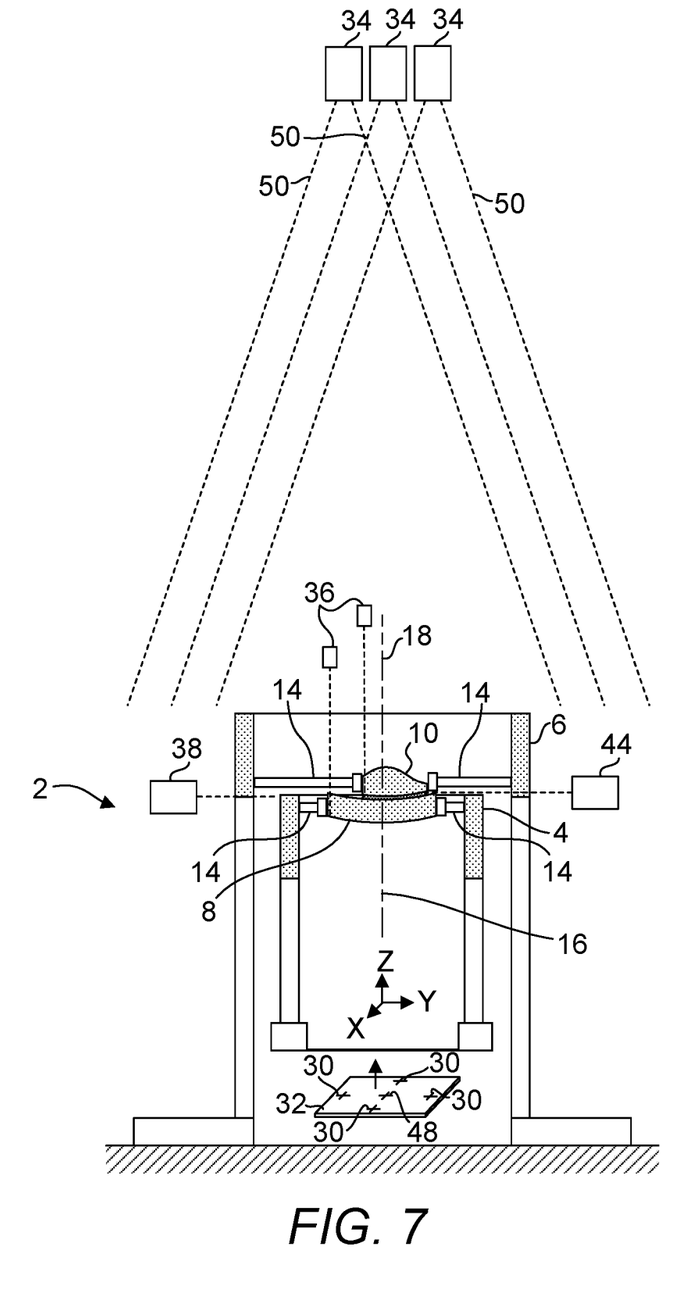
FIG. 7 is a diagram depicting one embodiment of a present alignment tool configured for optically aligning a plurality of lenses.

FIG. 7 is a diagram depicting one embodiment of a present alignment tool configured for optically aligning a plurality of lenses. Here, instead of using a collimated light beam, e.g., a laser beam, the concept of alignment of a plurality of optically-combined lenses 8, 10 is based on the detection of focused (or clear) images using a plurality of cameras 34. In this embodiment, a light panel 32 is disposed below the lenses 8, 10 to be aligned and a plurality of cameras 34 disposed above the lenses 8, 10. In one embodiment, markers 30, 48 each disposed in a cross formation on the light panel 32. Three cameras 34 are used to capture images when the light panel is activated. The centrally-disposed camera 34 is aligned with the central axis of the light panel 32 and the centrally-disposed marker 48 while the other two are aligned off-axis to the central axis of the light panel 32. An outlying camera 34 is preferably aligned with a peripherally-disposed marker 30. If this is not possible, either an outlying camera 34 or the light panel 32 can be moved laterally, i.e., in an X-Y plane such that a peripherally-disposed marker 30 are in alignment with an outlying camera 34. The first adjustments to at least one of lenses 8, 10 are made to ensure that the centrally-disposed marker 48 comes into focus at the centrally-disposed camera 34. Once this has been achieved, the outlying cameras 34 are then disposed at identical optical settings to the centrally-disposed camera 34. This is followed by making additional adjustments to at least one of lenses 8, 10 to ensure that the peripherally-disposed markers 30 also come into focus, respectively. Once all the markers 30, 48 have come into focus with their respective cameras 34, the first and second lenses 8, 10 are said to have been optically aligned.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An alignment tool comprising:
   (a) a first positioning system comprising an at least 5-axis positioning system, said first positioning system configured for positioning and orientating a first lens having an optical axis;
   (b) a second positioning system comprising an at least 5-axis positioning system, said second positioning system configured for positioning and orientating a second lens having an optical axis;
   (c) a light source disposed optically upstream from said first positioning system; and
   (d) a telecentric lens disposed optically downstream from the second lens,
   wherein a laser beam of said light source is configured to be disposed through the first lens and the second lens to cast an image onto an image plane, said telecentric lens is configured to remove an angular shift of the image, the image comprising a light spot on the image plane, if the light spot does not stay stationary on the image plane when at least one of the first lens and the second lens is rotated about the central axis of the laser beam, at least one of said first positioning system and said second positioning system is actuated to alter at least one of the position and orientation of at least one of the first lens and the second lens until the light spot becomes stationary on the image plane, indicating the first lens is coaxially disposed with the second lens.

2. The alignment tool of claim 1, wherein at least one of said first positioning system and said second positioning system is a 6-axis positioning system.

3. The alignment tool of claim 1, wherein at least one of the first lens and the second lens is an irregularly-shaped lens.

4. The alignment tool of claim 1, further comprises a fixing tool configured for permanently fixing the first lens to the second lens.

5. A method for optically aligning two lenses each having an optical axis, said method comprising projecting a laser beam through the two lenses and a telecentric lens to cast an image on an image plane, the telecentric lens is configured to remove an angular shift of the image, wherein the image comprises a light spot on the image plane, if the light spot does not stay stationary on the image plane when at least one of the two lenses is rotated about the central axis of the laser beam, at least one of the relative position and relative orientation of the two lenses is altered until the light spot becomes stationary on the image plane, indicating the optical axes of the two lenses are coaxially disposed.

6. The method of claim 5, wherein the at least one of the relative position and relative orientation of the two lenses is altered using an at least 5-axis positioning system.

7. The method of claim 5, at least one of the two lenses is an irregularly-shaped lens.

8. A method for optically aligning two lenses each having an optical axis, using two positioning systems each comprising an at least 5-axis positioning system and configured to control the position and orientation of one of the two lenses, said method comprising projecting a laser beam through the two lenses and a telecentric lens to cast an image on an image plane, the telecentric lens is configured to remove an angular shift of the image, wherein the image comprises a light spot on the image plane, if the light spot does not stay stationary on the image plane when at least one of the first lens and the second lens is rotated about the central axis of the laser beam, at least one of the relative position and relative orientation of the two lenses is altered using at least one of the two positioning systems until the light spot becomes stationary on the image plane, indicating the optical axes of the two lenses are coaxially disposed.

9. The method of claim 8, at least one of the two lenses is an irregularly-shaped lens.

* * * * *